United States Patent [19]
Marshall et al.

[11] Patent Number: 5,828,420
[45] Date of Patent: Oct. 27, 1998

[54] VIDEO MIX PROGRAM GUIDE

[75] Inventors: Connie T. Marshall, Muskogee; Thomas R. Lemmons, Coweta; Donald W. Allison, Tulsa, all of Okla.

[73] Assignee: Prevue Networks, Inc., Tulsa, Okla.

[21] Appl. No.: 599,143

[22] Filed: Feb. 9, 1996

Related U.S. Application Data

[63] Continuation of Ser. No. 234,060, Apr. 28, 1994, Pat. No. 5,502,504.

[51] Int. Cl.$^6$ .............................. H04N 7/00; H04N 9/74
[52] U.S. Cl. .......................... 348/564; 348/906; 348/586
[58] Field of Search .................................... 348/565, 589, 348/584, 13, 552, 563, 598, 906, 6, 7, 10, 12, 586, 564; H04N 7/10, 7/00, 9/74

[56] References Cited

U.S. PATENT DOCUMENTS 5,559,548   9/1996   Davis et al. ............................ 348/906

*Primary Examiner*—Victor R. Kostak
*Attorney, Agent, or Firm*—Fish & Neave

[57] ABSTRACT

A system interactively controlled by a TV viewer remote superimposes portions of a scroll program guide over a basic programming signal for display on the viewer's display screen. A tuner has an input for receiving TV signals in a plurality of cable channels and an output for passing a signal of any selected one of said channels. A computer has an input for receiving any of a plurality of control signals from the TV viewer remote and an output for controlling the tuner to pass the signal of the selected one of the channels in response to one of the plurality of control signals from the TV viewer remote. The computer receives and stores a scroll input picture image signal containing local program guide data and generates a scroll output picture image signal consisting of at least a portion of the scroll input picture image signal. A combiner superimposes output picture image signal over the passed signal to provide a display signal for input to the viewer's display screen. The computer is responsive to control signals from the remote to cause the combiner to change the weight of the output picture image signal in relation to the passed signal.

14 Claims, 6 Drawing Sheets

VIDEO MIX PROGRAM GUIDE

This is a continuation of application Ser. No. 08/234,060, filed Apr. 28, 1994, now U.S. Pat. No. 5,502,504.

BACKGROUND OF THE INVENTION

This invention relates generally to interactive video communications and more particularly concerns viewer controlled channel programming guide displays.

Programming guide information is presently displayed to the home TV viewer in a non-interactive scroll on a single channel dedicated to programming guide information.

When the home viewer selects the programming guide channel, viewing of the channel previously selected is interrupted. While the viewer executes best judgment to when to make the change, key portions of the program on the previously selected channel may be missed. This is especially probable in cases of live programming. It is also especially irritating to the viewers not in possession of the controller.

It is, therefore, an object of this invention to provide a process and in-home scrolling hardware by which a home viewer may interactively control a channel programming guide. Another object of this invention is to provide a process and in-home scrolling hardware in which the scroll can be simultaneously superimposed on and displayed with the programming of any channel accessible to the home viewer. Another object of this invention is to provide a process and in-home scrolling hardware by which a home viewer may control the comparative weight of the programming guide or superimposed signal in relation to the basic programming signal over which it is superimposed.

SUMMARY OF THE INVENTION

In accordance with the invention, a system interactively controlled by a TV viewer remote control transmitter displays a scroll program guide superimposed on the normal programming displayed on any channel accessible to the viewer's display screen. A tuner receives TV radio frequency or optical transmission signals in a plurality of cable channels and passes a viewer usable signal of any selected one of the channels to a signal combiner. A computer receives any of a plurality of control signals from the TV viewer remote control transmitter. It also controls the tuner to pass the viewer usable signal of any selected channel in response to one of the control signals from the TV viewer remote control transmitter. It also receives and stores a scroll input picture image signal containing local program guide data and generates a scroll output picture image signal consisting of at least a portion of the scroll input picture image signal. The signal combiner combines the viewer usable signal of any selected channel from the tuner with the output picture image signal from the computer to provide a display signal with the program guide display superimposed over the channel programming display for input to the viewer's display screen. The computer is responsive to a control signal from the remote to change the weight of the superimposed signal in relation to the base or normal programming signal.

BRIEF DESCRIPTION OF THE DRAWINGS

Other objects and advantages of the invention will become apparent upon reading the following detailed description and upon reference to the drawings in which.

While the invention will be described in connection with a preferred embodiment and process, it will be understood that it is not intended to limit the invention to that embodiment or process. On the contrary, it is intended to cover all alternatives, modifications and equivalents as may be included within the spirit and scope of the invention as defined by the appended claims.

DETAILED DESCRIPTION OF THE INVENTION

Figure 1:
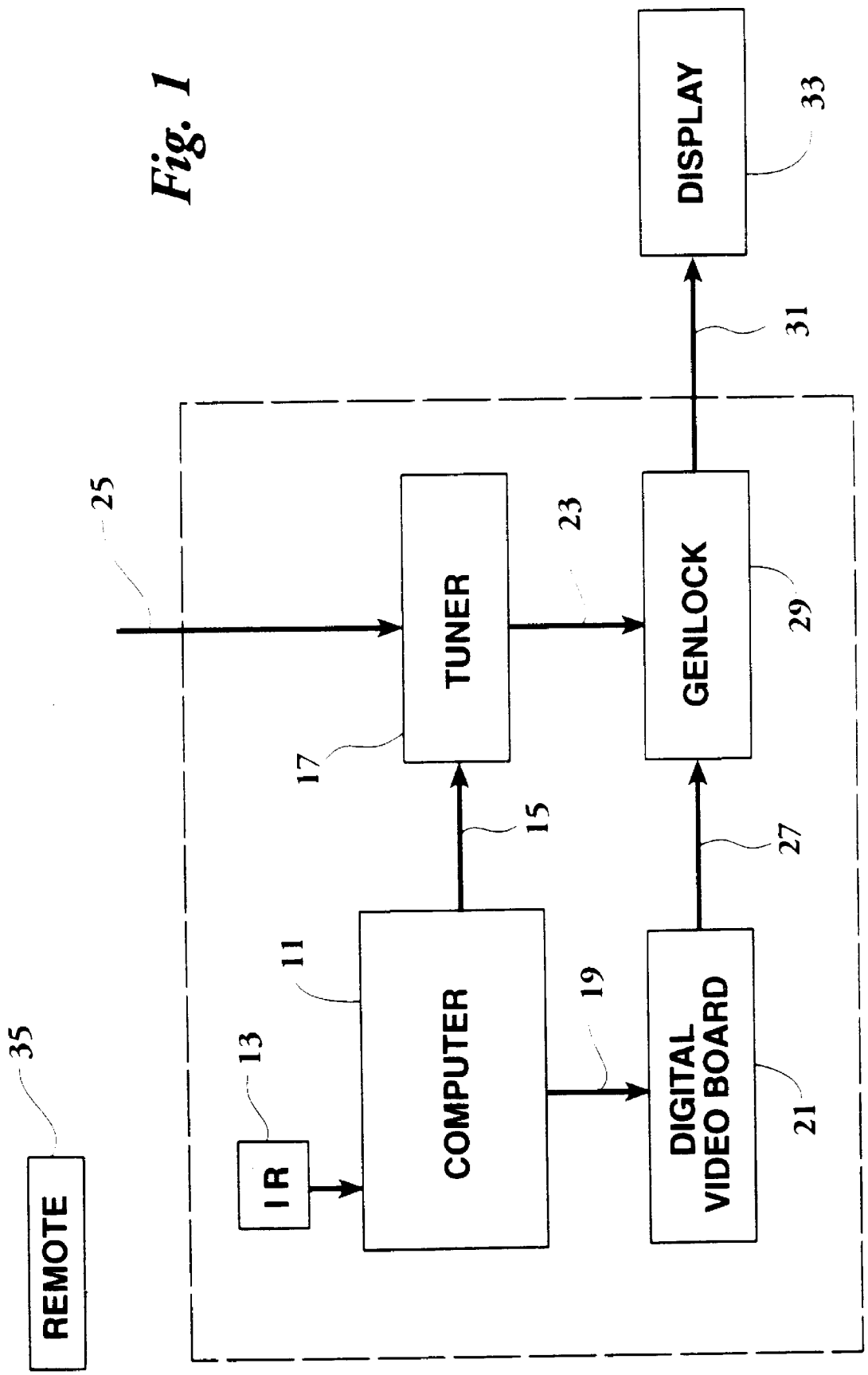
FIG. 1 is a block diagram illustrating a preferred embodiment of the hardware of the interactive scrolling program guide.

Turning first to FIG. 1, the components of the interactive scroll program guide are illustrated. A computer 11 having a command information receiver, preferably an infrared or radio frequency receiver 13, provides a control signal 15 to a tuner 17 and a picture image signal 19 to a digital video board 21. The tuner 17 converts or demodulates radio frequencies or optical transmissions to a signal usable by the viewer to output a signal 23 selected from a plurality of signals 25 input to the tuner 17 from the cable source (not shown), typically frequency division multiplexed video, audio and data signals transmitted via a coaxial cable, over-the-air radio frequencies or fiber optics. The digital video board 21 converts digital data into a video signal. The tuner output or base programming signal 23 has superimposed thereon a scroll information picture image signal 27 from the digital video board 21 in a genlock signal combiner or overlayer 29. The combined scroll and TV picture signal 31 is then displayed on a video signal display device such as the display screen 33 of the viewer's television. The combiner 29 permits the viewer to select the weight of the scroll information picture signal 27 in relation to the base programming signal 23. The viewer sends commands to the receiver 13 to control the operation of the computer 11 by the use of a remote control transmitter, preferably an infrared or radio frequency transmitter 35. The computer 11 is based on microprocessor and may utilize random access (RAM) and/or read only (ROM) memory. The software necessary to operate the microprocessor may be embedded in the device or downloaded via the cable system to the device.

Figure 2:
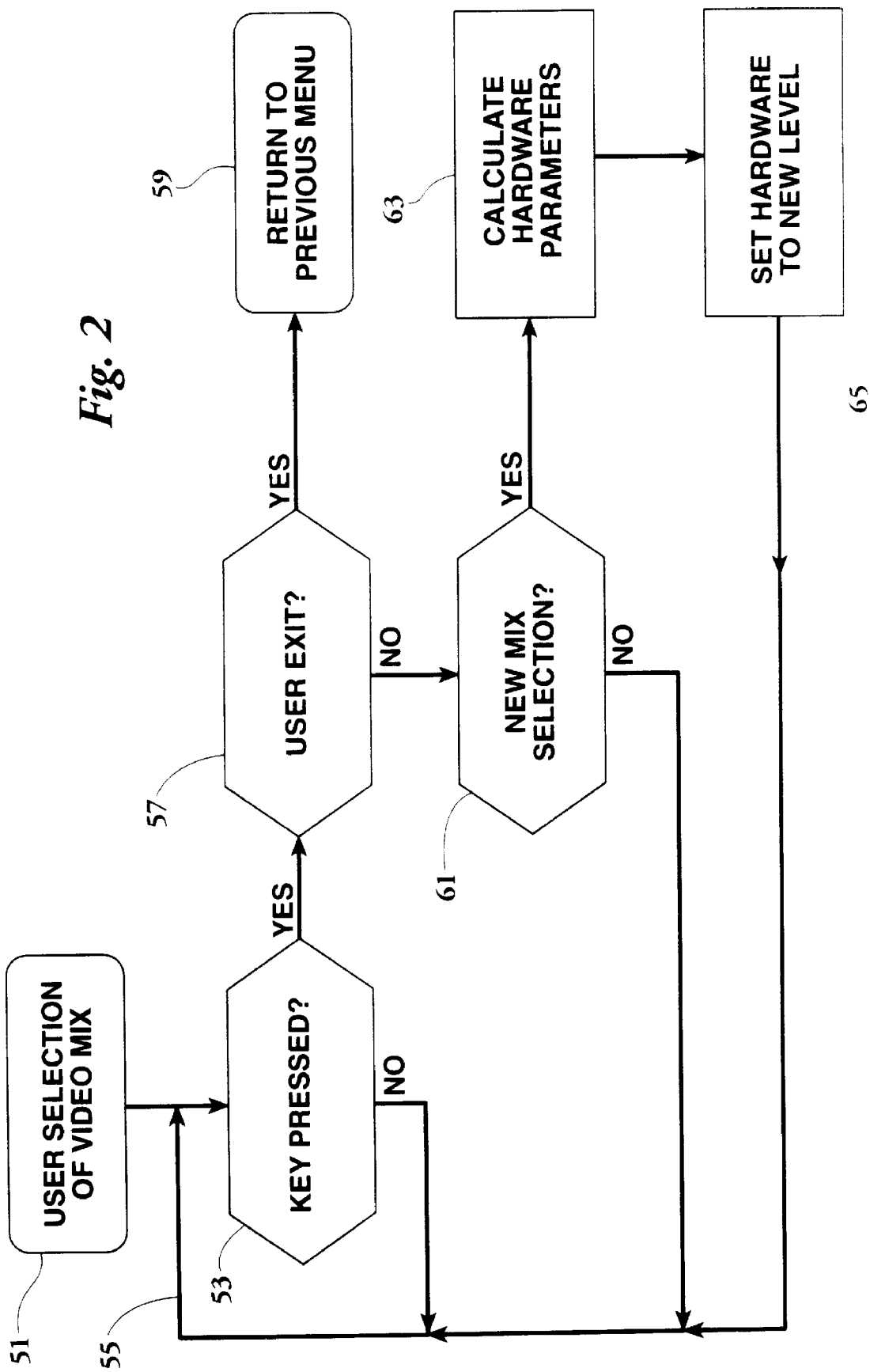
FIG. 2 is a flow chart illustrating the basic process and options of the video mix capability of the interactive scrolling program guide.
Figure 3:
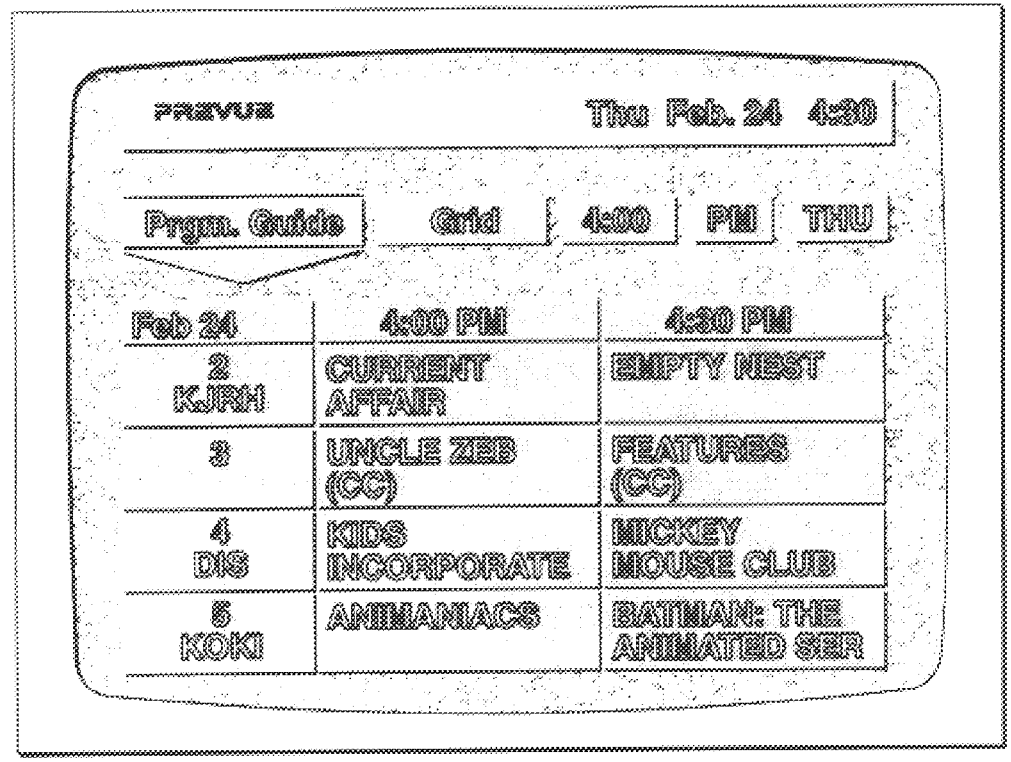
FIG. 3 is a representation of an interactive scrolling program guide menu display.
Figure 4:
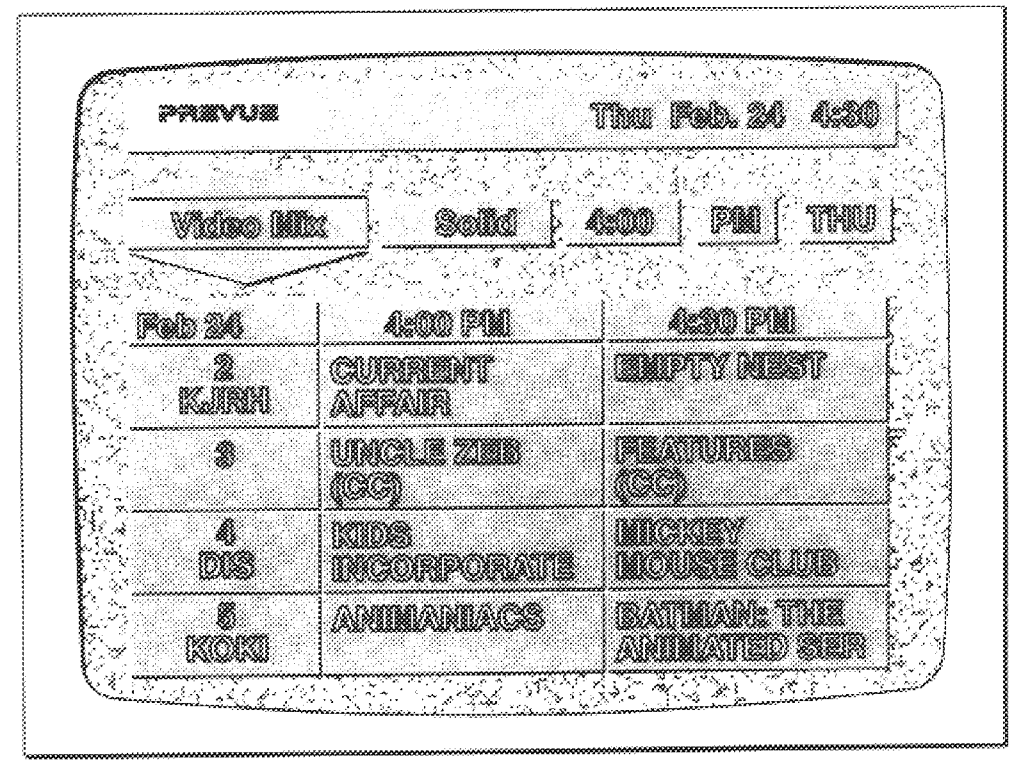
FIG. 4 is a representation of an interactive scrolling program guide display in a video mix mode.
Figure 5:
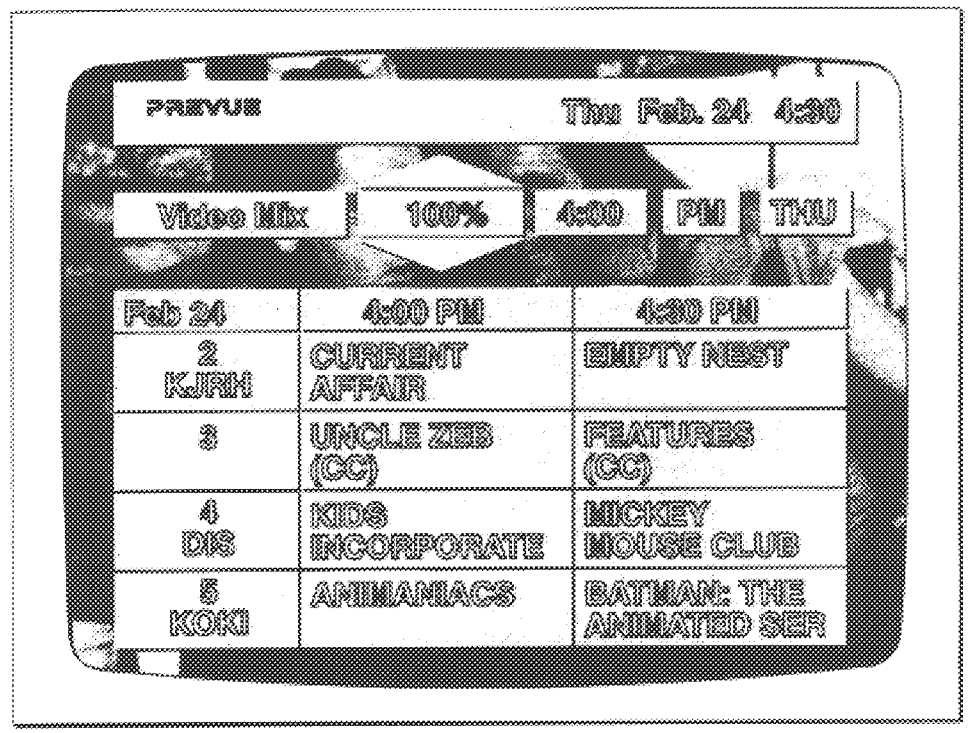
FIG. 5 is a representation of the interactive scrolling program guide display in a solid or one hundred percent programming guide condition relative to the base signal.
Figure 6:
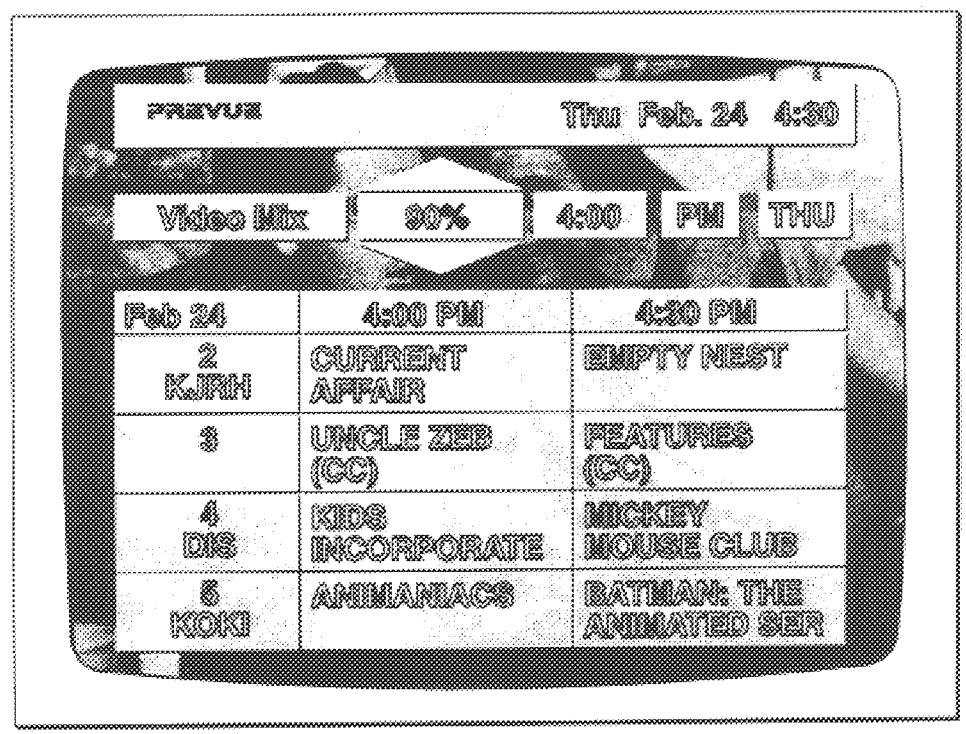
FIG. 6 is a representation of the interactive scrolling program guide display in a solid or ninety percent programming guide condition relative to the base signal.
Figure 7:
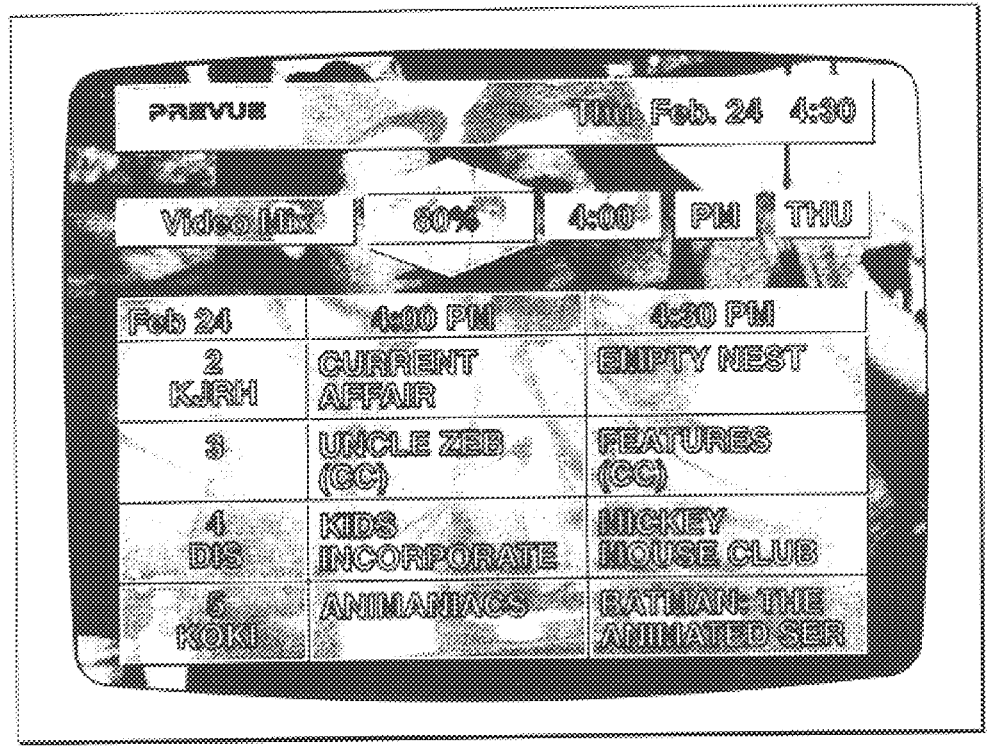
FIG. 7 is a representation of the interactive scrolling program guide display in a solid or eighty percent programming guide condition relative to the base signal.
Figure 8:
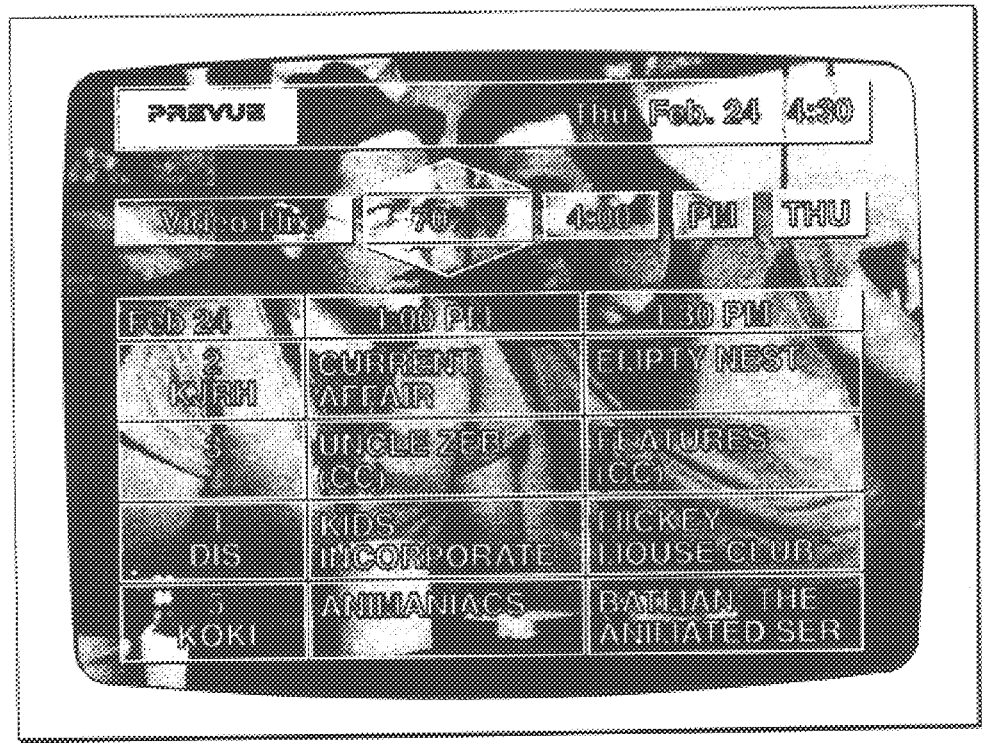
FIG. 8 is a representation of the interactive scrolling program guide display in a solid or seventy percent programming guide condition relative to the base signal.
Figure 9:
FIG. 9 is a representation of the interactive scrolling program guide display in a solid or sixty percent programming guide condition relative to the base signal.

The above described interactive scroll program guide components operate in response to the control of the computer 11. As shown in FIG. 2, while the home viewer is watching programming presented on his display 33 in response to the tuner 17 feeding any basic program signal 23 from the input selections 25 to the genlock combiner 29, the viewer may opt to simultaneously view the programming guide scroll available to the combiner 29 from the computer 11 through the digital video board 21. The viewer simply presses a predetermined key on the remote 35 to select the program guide display as is illustrated in FIG. 3. As shown in FIG. 3, the program guide nomenclature (Prgm Guide) will appear on the screen between arrows indicating upward or downward menu access to the possible choices in the program guide routine. By use of the up and down arrows on the controller 35, the program guide menu can be manipulated to the "video mix" condition, illustrated as step 51 in the routine of FIG. 2. The visual appearance of the viewer's display 33 in the "video mix" condition is illustrated in FIG. 4. Upon "user selection of video mix" 51, the computer 11 routine inquires as to whether or not there has been a key pressed 53 requesting that the weight of the program guide signal 27 be changed in relation to the basic programming signal 23. If the answer to this inquiry is "NO", routing proceeds through a path 55 to continue the "key pressed" inquiry 53. If the response to the "key pressed" inquiry 53 is "YES", the routine continues to a "user exit" inquiry 57. If the viewer has opted to exit the video mix routine, a "YES" response to the "user exit" inquiry 57 will result in a "return to the previous menu" 59. If, however, the response to the "user exit inquiry" 57 is "NO", the routine continues to a new mix selection inquiry 61. If the response to the "new mix selection" inquiry 61 is "NO", the routine returns via the route 55 to the original "key pressed" inquiry 53. If the answer to the "new mix selection" inquiry 61 is "YES", the routine proceeds through the "calculate hardware parameters step" 63 and the "set hardware to new level" step 65, at which point the genlock combiner 29 automatically performs these functions to establish the weight of the program guide signal 27 superimposed by the genlock combiner 29 over the basic programming signal 23. When the hardware is set to its new level 65, the routine continues through the path 55 to the "key pressed" inquiry 53 to determine whether the viewer has again selected a different percentage of signal mix.

FIGS. 5 through 9 illustrate the solid or one hundred percent video mix, ninety percent video mix, eighty percent video mix, seventy percent video mix and sixty percent video mix, respectively, the percentage indicating the weight the programming guide signal 27 superimposed on the basic programming signal 23.

If the video mix routine is exited and later reselected, the weight of the programming guide signal 27 will automatically be the weight last opted by the viewer.

Thus, each individual viewer will be provided with a scroll program guide in which the home viewer can interactively determine whether the program guide scroll should be displayed and, if so, its weight relative to the basic program data.

Thus, it is apparent that there has been provided, in accordance with the invention, a video mix program guide that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A system interactively controlled by a remote control for displaying a program guide on a display screen, comprising:

a tuner for receiving television signals corresponding to a plurality of television channels and providing an output television signal corresponding to a selected television channel of the plurality of television channels;

computer circuitry for receiving control signals from the remote control and for receiving program guide data for the program guide, the computer circuitry generating a program guide output signal corresponding to at least a portion of the program guide data; and superimposing circuitry for displaying the program guide with a perceived transparency on the selected television channel on the display screen by combining the program guide output signal and the output television signal.

2. The system of claim 1, wherein the computer circuitry is responsive to control signals from the remote control that cause the superimposing circuitry to change a weight of the program guide output signal in relation to the output television signal, such that when the computer circuitry increases the weight of the program guide output signal, the combined signal generated by the superimposing circuitry causes a decrease in the perceived transparency of the displayed portions of the program guide on the display screen, thereby causing the selected television channel to appear less visible through the program guide.

3. The system of claim 2, wherein the computer circuitry is responsive to control signals from the remote control to activate and deactivate the program guide, the computer circuitry setting the weight of the program guide output signal upon activation of the program guide to the weight set at the time of the most recent deactivation of the program guide.

4. The system of claim 1, wherein the computer circuitry is responsive to control signals from the remote control that cause the superimposing circuitry to change a weight of the program guide output signal in relation to the output television signal, such that when the computer circuitry decreases the weight of the program guide output signal, the combined signal generated by the superimposing circuitry causes an increase in the perceived transparency of the displayed portions of the program guide on the display screen, thereby causing the selected television channel to appear more visible through the program guide.

5. The system of claim 4, wherein the computer circuitry is responsive to control signals from the remote control to activate and deactivate the program guide, the computer circuitry setting the weight of the program guide output signal upon activation of the program guide to the weight set at the time of the most recent deactivation of the program guide.

6. The system of claim 1, wherein the program guide output signal comprises a scroll program guide output signal for causing the display screen to display a scrolling program guide.

7. The system of claim 1, wherein the display screen displays information representing the weight of the program guide output signal in relation to the output television signal.

8. A method of displaying a program guide on a display screen comprising the steps of:

receiving television signals corresponding to a plurality of television channels;

providing an output television signal corresponding to a selected television channel of the plurality of television channels;

receiving program guide data for the program guide;

generating a program guide output signal corresponding to at least a portion of the program guide data; and displaying the program guide with a perceived transparency on the selected television channel on the display screen by combining the program guide output signal and the output television signal.

9. The method of claim 8, wherein the program guide output signal has a viewer selectable weight in relation to the output television signal, the method further comprising the step of increasing the weight of the program guide output signal, thereby causing a decrease in the perceived transparency of the displayed portions of the program guide on the display screen and causing the selected television channel to appear less visible through the displayed portions of the program guide.

10. The method of claim 9 further comprising the step of setting the weight of the program guide output signal upon activation of the program guide to the weight set at the time of the most recent deactivation of the program guide.

11. The method of claim 8, wherein the program guide output signal has a viewer selectable weight in relation to the output television signal, the method further comprising the step of decreasing the weight of the program guide output signal, thereby causing an increase in the perceived transparency of the displayed portions of the program guide on the display screen and causing the selected television channel to appear more visible through the displayed portions of the program guide.

12. The method of claim 11 further comprising the step of setting the weight of the program guide output signal upon activation of the program guide to the weight set at the time of the most recent deactivation of the program guide.

13. The method of claim 8, wherein the program guide output signal comprises a scroll program guide output signal, the method further comprising the step of displaying a scrolling program guide on the display screen.

14. The method of claim 8 further comprising the step of displaying information representing the weight of the program guide output signal in relation to the output television signal on the display screen.

* * * * *

UNITED STATES PATENT AND TRADEMARK OFFICE
CERTIFICATE OF CORRECTION

PATENT NO.    :   5,828,420
DATED         :   October 27, 1998
INVENTOR(S)   :   Connie T. Marshall et al.

It is certified that error appears in the above-indentified patent and that said Letters Patent is hereby corrected as shown below:

Column 2, line 12, delete "solid or".

Column 2, line 15, delete "solid or".

Column 2, line 18, delete "solid or".

Column 2, line 21, delete "solid or".

Column 2, line 60, insert --a-- after "on" and before "microprocessor".

Signed and Sealed this

Twenty-fifth Day of May, 1999

Attest:

Q. TODD DICKINSON

Attesting Officer

Acting Commissioner of Patents and Trademarks

UNITED STATES PATENT AND TRADEMARK OFFICE
CERTIFICATE OF CORRECTION

PATENT NO. : 5,828,420
DATED : October 27, 1998
INVENTOR(S) : Marshall et al.

It is certified that error appears in the above-identified patent and that said Letters Patent is hereby corrected as shown below:

Title page.
Item [56] References Cited
Please insert the following references after "Davis et al. ......... 348/906"

| | | | |
|---|---|---|---|
| -- | 4,203,130 | 5/1980 | Doumit et al. ...................358/1 |
| | 4,344,090 | 8/1982 | Bellsomi et al. ..................358/183 |
| | 4,488,179 | 12/1984 | Krüger et al. ....................358/181 |
| | 4,706,121 | 11/1987 | Young ............................358/142 |
| | 4,751,578 | 6/1988 | Reiter et al. ....................358/143 |
| | 4,787,063 | 11/1988 | Muguet ..........................364/900 |
| | 4,896,347 | 1/1990 | Auber ............................379/96 |
| | 4,899,139 | 2/1990 | Ishimochi et al. ................340/721 |
| | 4,963,994 | 10/1990 | Levine ...........................358/335 |
| | 4,977,455 | 12/1990 | Young ...........................358/142 |
| | 5,038,211 | 8/1991 | Hallenbeck ....................358/142 |
| | 5,047,867 | 9/1991 | Strubbe et al. .................358/335 |
| | 5,151,789 | 9/1992 | Young ...........................358/194.1 |
| | 5,253,066 | 10/93 | Vogel ...........................358/188 |
| | 5,353,121 | 10/1994 | Young et al. ...................358/563 |
| | 5,404,393 | 4/1995 | Remillard ......................379/96 |
| | 5,412,720 | 5/1995 | Hoarty ..........................380/15 |
| | 5,465,385 | 11/1995 | Ohga et al. ....................455/6.1 |
| | 5,479,268 | 12/1995 | Young et al. ...................358/335 |

FOREIGN PATENT DOCUMENTS

| | | |
|---|---|---|
| 0 637 849 A1 | 12/1994 | European Patent Office |
| 60-61935 | 04/1985 | Japan |
| 5 217 144 A | 10/1989 | United Kingdom |
| WO 90/13204 | 11/1990 | WIPO |
| WO 90/15507 | 12/1990 | WIPO |

UNITED STATES PATENT AND TRADEMARK OFFICE
CERTIFICATE OF CORRECTION

PATENT NO.     : 5,828,420
DATED          : October 27, 1998
INVENTOR(S)    : Marshall et al.

It is certified that error appears in the above-identified patent and that said Letters Patent is hereby corrected as shown below:

OTHER PUBLICATIONS

"Addressable Converters: A New Development at CableData," *Via Cable,* Vol. 1, No. 12 (Dec. 1981).

Vito Brugliera, "Digital On-Screen Display A New Technology for the Consumer Interface," *Symposium Record Cable Sessions,* 18th Internationl Television Symposium and Technical Exhibition, Montreux, Switzerland 10-15 June 1993, 571-586 (June 11, 1993).

CableData brochure, "A New Approach To Addressability" (undated).

Neil W. Heckt, "Multiplying Video Mixer," p. 135, NTIS Tech Notes (1990) February. --

Signed and Sealed this

Nineteenth Day of February, 2002

*Attest:*

JAMES E. ROGAN
*Attesting Officer*     *Director of the United States Patent and Trademark Office*

UNITED STATES PATENT AND TRADEMARK OFFICE
CERTIFICATE OF CORRECTION

PATENT NO.    : 5,828,420
DATED         : October 27, 1998
INVENTOR(S)   : Marshall et al.

It is certified that error appears in the above-identified patent and that said Letters Patent is hereby corrected as shown below:

<u>Title page,</u>
Item [56] References Cited
Please insert the following references after "Davis et al.   ........ 348/906"

| | | | |
|---|---|---|---|
| -- | 4,203,130 | 5/1980 | Doumit et al. .........................358/1 |
| | 4,344,090 | 8/1982 | Bellsomi et al. ......................358/183 |
| | 4,488,179 | 12/1984 | Krüger et al. ........................358/181 |
| | 4,706,121 | 11/1987 | Young ..............................358/142 |
| | 4,751,578 | 6/1988 | Reiter et al. ........................358/143 |
| | 4,787,063 | 11/1988 | Muguet ............................364/900 |
| | 4,896,347 | 1/1990 | Auber ..............................379/96 |
| | 4,899,139 | 2/1990 | Ishimochi et al. .....................340/721 |
| | 4,963,994 | 10/1990 | Levine ..............................358/335 |
| | 4,977,455 | 12/1990 | Young ..............................358/142 |
| | 5,038,211 | 8/1991 | Hallenbeck ........................358/142 |
| | 5,047,867 | 9/1991 | Strubbe et al. ......................358/335 |
| | 5,151,789 | 9/1992 | Young ..............................358/194.1 |
| | 5,253,066 | 10/93 | Vogel ..............................358/188 |
| | 5,353,121 | 10/1994 | Young et al. ........................358/563 |
| | 5,404,393 | 4/1995 | Remillard ..........................379/96 |
| | 5,412,720 | 5/1995 | Hoarty .............................380/15 |
| | 5,465,385 | 11/1995 | Ohga et al. ......................... 455/6.1 |
| | 5,479,268 | 12/1995 | Young et al. ....................... 358/335 |

FOREIGN PATENT DOCUMENTS

| | | |
|---|---|---|
| 0 637 849 A1 | 12/1994 | European Patent Office |
| 60-61935 | 04/1985 | Japan |
| 2 217 144 A | 10/1989 | United Kingdom |
| WO 90/13204 | 11/1990 | WIPO |
| WO 90/15507 | 12/1990 | WIPO |

UNITED STATES PATENT AND TRADEMARK OFFICE
CERTIFICATE OF CORRECTION

PATENT NO. : 5,828,420
DATED : October 27, 1998
INVENTOR(S) : Marshall et al.

It is certified that error appears in the above-identified patent and that said Letters Patent is hereby corrected as shown below:

OTHER PUBLICATIONS

"Addressable Converters: A New Development at CableData," *Via Cable*, Vol. 1, No. 12 (Dec. 1981).

Vito Brugliera, "Digital On-Screen Display A New Technology for the Consumer Interface," *Symposium Record Cable Sessions*, 18th Internationl Television Symposium and Technical Exhibition, Montreux, Switzerland 10-15 June 1993, 571-586 (June 11, 1993).

CableData brochure, "A New Approach To Addressability" (undated).

Neil W. Heckt, "Multiplying Video Mixer," p. 135, NTIS Tech Notes (1990) February. --

This certificate supersedes Certificate of Correction issued February 19, 2002

Signed and Sealed this

Sixteenth Day of July, 2002

*Attest:*

JAMES E. ROGAN
*Attesting Officer*   *Director of the United States Patent and Trademark Office*

(12) EX PARTE REEXAMINATION CERTIFICATE (9699th)
United States Patent
Marshall et al.

(10) Number: US 5,828,420 C1
(45) Certificate Issued: Jun. 7, 2013

(54) VIDEO MIX PROGRAM GUIDE

(75) Inventors: Connie T. Marshall, Muskogee, OK (US); Thomas R. Lemmons, Coweta, OK (US); Donald W. Allison, Tulsa, OK (US)

(73) Assignee: JPMorgan Chase Bank, N.A., New York, NY (US)

Reexamination Request:
No. 90/011,231, Sep. 14, 2010

Reexamination Certificate for:
Patent No.: 5,828,420
Issued: Oct. 27, 1998
Appl. No.: 08/599,143
Filed: Feb. 9, 1996

Certificate of Correction issued May 25, 1999
Certificate of Correction issued Feb. 19, 2002
Certificate of Correction issued Jul. 16, 2002

Related U.S. Application Data

(63) Continuation of application No. 08/234,060, filed on Apr. 28, 1994, now Pat. No. 5,502,504.

(51) Int. Cl.
*H04N 7/088* (2006.01)
*H04N 5/445* (2011.01)
*H04N 7/087* (2006.01)

(52) U.S. Cl.
USPC .. 725/47; 348/586; 348/E5.105; 348/E7.034; 725/39

(58) Field of Classification Search
None
See application file for complete search history.

(56) References Cited

To view the complete listing of prior art documents cited during the proceeding for Reexamination Control Number 90/011,231, please refer to the USPTO's public Patent Application Information Retrieval (PAIR) system under the Display References tab.

*Primary Examiner* — Ovidio Escalante

(57) ABSTRACT

A system interactively controlled by a TV viewer remote superimposes portions of a scroll program guide over a basic programming signal for display on the viewer's display screen. A tuner has an input for receiving TV signals in a plurality of cable channels and an output for passing a signal of any selected one of said channels. A computer has an input for receiving any of a plurality of control signals from the TV viewer remote and an output for controlling the tuner to pass the signal of the selected one of the channels in response to one of the plurality of control signals from the TV viewer remote. The computer receives and stores a scroll input picture image signal containing local program guide data and generates a scroll output picture image signal consisting of at least a portion of the scroll input picture image signal. A combiner superimposes output picture image signal over the passed signal to provide a display signal for input to the viewer's display screen. The computer is responsive to control signals from the remote to cause the combiner to change the weight of the output picture image signal in relation to the passed signal.

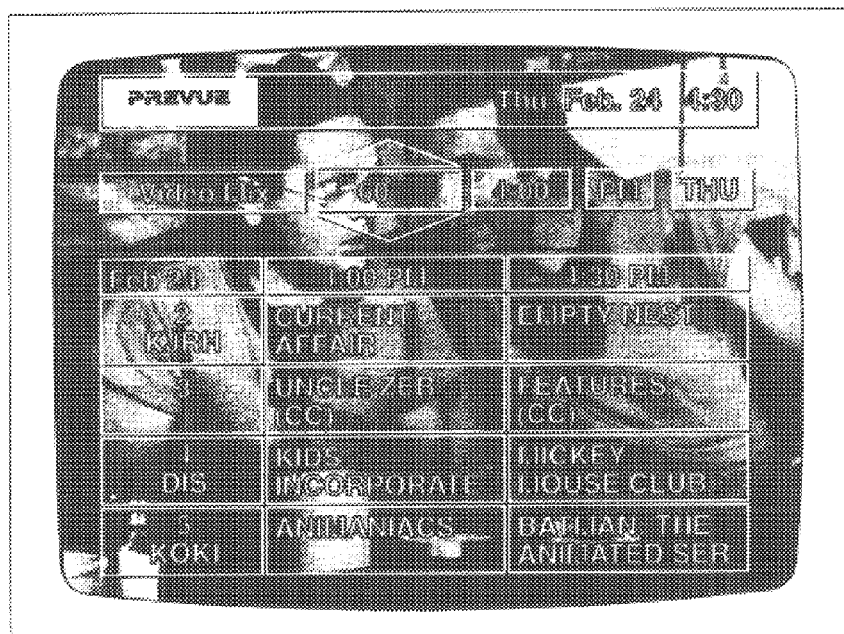

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1, 6, 8 and 13 are cancelled.
Claims 2-5, 7, 9-12 and 14 were not reexamined.

* * * * *